US006223033B1

United States Patent
Lusterman

(10) Patent No.: US 6,223,033 B1
(45) Date of Patent: Apr. 24, 2001

(54) THIN FILM CYLINDRICAL ANTENNA FOR USE IN A TEST STATION

(75) Inventor: David Robert Lusterman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/170,868

(22) Filed: Oct. 13, 1998

(51) Int. Cl.[7] ................................................. H04M 1/24
(52) U.S. Cl. ........................... 455/425; 455/95; 455/67.1
(58) Field of Search .................................. 455/425, 423, 455/424, 67.1, 575, 95, 97

(56) References Cited

U.S. PATENT DOCUMENTS

| | | | | |
|---|---|---|---|---|
| 4,220,955 | * | 9/1980 | Frye | 343/703 |
| 5,711,014 | * | 1/1998 | Crowley et al. | 455/575 |
| 5,805,667 | * | 9/1998 | Alvarez et al. | 455/425 |
| 5,854,970 | * | 12/1998 | Kivela | 455/90 |
| 5,910,977 | * | 6/1999 | Torregrossa | 455/425 |
| 6,095,820 | * | 8/2000 | Luxon et al. | 455/97 |

* cited by examiner

Primary Examiner—Daniel Hunter
Assistant Examiner—Thuan T. Nguyen
(74) Attorney, Agent, or Firm—Crosby, Heafey, Roach & May

(57) ABSTRACT

An apparatus for testing mobile phones of the type having a protruding antenna includes an air chamber which provides radio frequency shielding and which surrounds the mobile phone under test, a radio equipment automated testing circuit, an antenna mounted within the air chamber which includes a hollow cylinder of electrically insulating material for surrounding a portion of the protruding antenna during testing, a thin, electrically conductive film mounted on a surface of the hollow cylinder, the film including a first band portion extending in a circumferential direction entirely around a peripheral surface of the hollow cylinder, a finger portion extending from the first band portion in a direction parallel to an axis of rotation of the hollow cylinder, the finger portion tapering to a point at a location furtherest from the band portion, and a second band portion having a width that is smaller than the width of the first band portion, and extending from the point of the finger portion in a circumferential direction only partially around the peripheral surface of the hollow cylinder, and an electrical connection to the point of the finger portion for connecting the antenna to the radio equipment automated testing circuit.

12 Claims, 3 Drawing Sheets

THIN FILM CYLINDRICAL ANTENNA FOR USE IN A TEST STATION

BACKGROUND OF THE INVENTION

1. Field of the Invention

This invention relates to a low cost, easy to use production test apparatus for PCS and cellular telephones and, more particularly, to a thin film cylindrical antenna for such a test apparatus.

2. Related Art

Currently, PCS and cellular telephone production tests require that the Unit Under Test (UUT) be placed in a large anechoic chamber with a directional antenna pointed at the antenna. This test relies on the assumption that the antenna characteristics do not vary spatially from one UUT to the next, which is frequently not the case because this parameter is less tightly controlled than the limits of the test allow. This causes many unacceptable false failures, whereas widening the test limits allows bad units to pass. The test chamber is also very large and costly. What is needed is a simple to use, low cost PCS and cellular telephone production test apparatus.

SUMMARY OF THE INVENTION

An apparatus according to the invention for testing mobile phones of the type having a protruding antenna includes an air chamber which provides radio frequency shielding and which surrounds the mobile phone under test, a radio equipment automated testing circuit, an antenna mounted within the air chamber which includes a hollow cylinder of electrically insulating material for surrounding a portion of the protruding antenna during testing, a first, thin, electrically conductive film mounted on a surface of the hollow cylinder which acts as the primary antenna portion, and an integral matching network comprised of another thin film portion mounted on the hollow cylinder and connected to the first thin film. The first thin film includes a first band portion extending in a circumferential direction entirely around a peripheral surface of the hollow cylinder. The second thin film, which makes up the integral matching network, includes a finger portion extending from the first band portion in a direction parallel to an axis of rotation of the hollow cylinder, the finger portion tapering to a point at a location furthest from the band portion, and a second band portion having a width that is smaller than the width of the first band portion, and extending from the point of the finger portion in a circumferential direction only partially around the peripheral surface of the hollow cylinder. An electrical connection is made to the point of the finger portion for connecting the antenna to the radio equipment automated testing circuit.

The invention further includes the antenna itself and the method of its use in testing the mobile phone within the air chamber using the radio equipment automated testing circuit.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
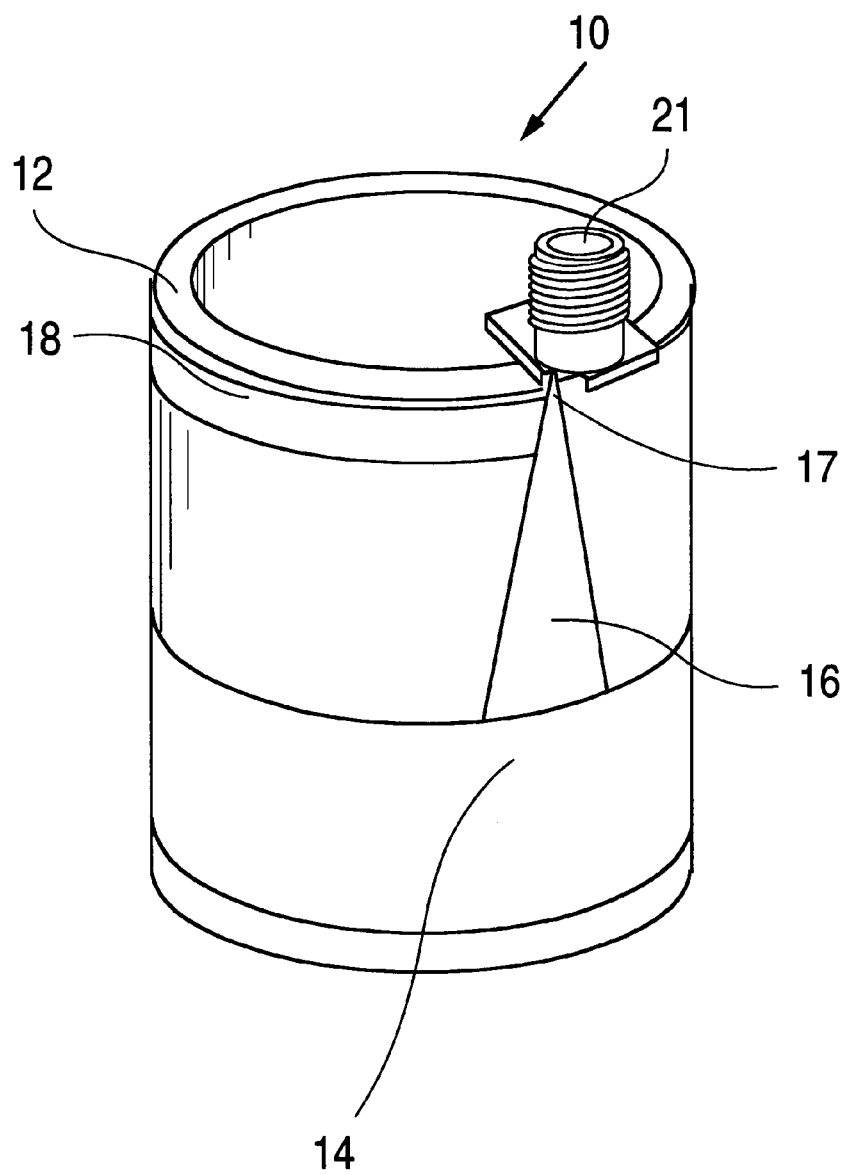
FIG. 1 is a perspective view of the thin film, cylindrical antenna according to the invention.
Figure 2:
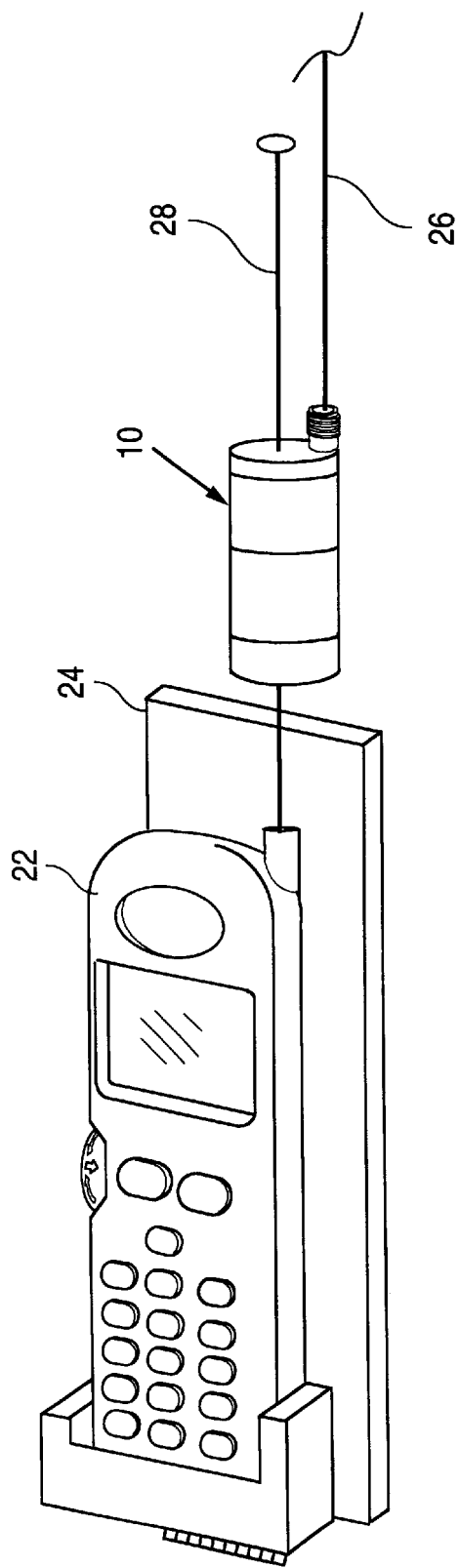
FIG. 2 is a perspective view of a UUT arranged with its antenna inserted within the antenna depicted in FIG. 1.
Figure 3:
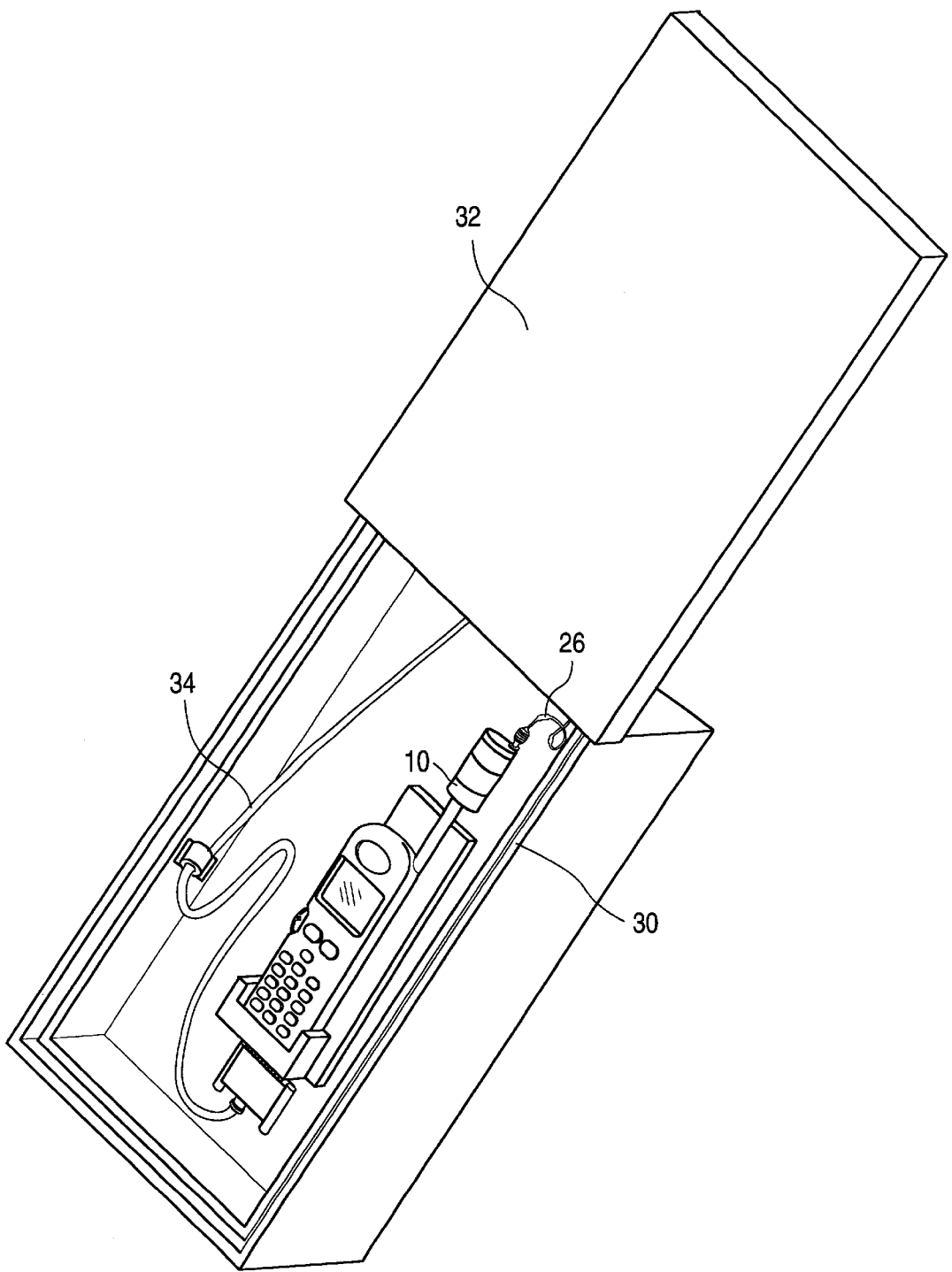
FIG. 3 is a perspective view of the arrangement of FIG. 2 when partially encased in a test box (with cover removed).

Referring to the figures, there is shown a thin film cylindrical antenna 10 with integral distributed matching network 18 to sample and spatially integrate the antenna output, so that unit to unit variations in antenna beam patterns are effectively neutralized. The antenna 10 comprises a hollow cylinder 12 of electrically insulating material for surrounding a portion of the protruding antenna 28 of a mobile phone 22 during testing, and a thin, electrically conductive film mounted on a surface of the hollow cylinder 12. The film includes a first band portion 14 extending in a circumferential direction entirely around a peripheral surface of the hollow cylinder 12. This first band portion 14 acts as the antenna proper. Connected to the first band portion 14 is an integral distributed matching network in the form of a thin film, electrically conductive finger 16 extending from the first band portion 14 in a direction parallel to an axis of rotation of the hollow cylinder 12, the finger 16 portion tapering to a point 17 at a location furthest from the first band portion 14. Also included in the matching network is a second band portion 18 having a width that is smaller than the width of the first band portion 14, and extending from the point 17 of the finger 16 portion in a circumferential direction only partially around, i.e. approximately half way around the peripheral surface of the hollow cylinder 12. An electrical connection 21 is made to the point 17 of the finger 16 portion for connecting the antenna 10 to a testing apparatus. Thus, the bands 14 and 18 are parallel to each other and extend around the axis of rotation of the cylinder 12.

The thin film is made of adhesive backed copper tape that is about 1.5 mils thick. The first band 14 is 3.300 inches in length and 0.770 inches in width. The second band is 2.480 inches in length and 0.200 inches in width. The finger 16 is 0.275 inches wide at its widest end and tapers to zero over a length of 0.760 inches. The hollow cylinder 12 can be ¾" polyvinyl chloride (PVC) 125 PSI pipe that is approximately 1.65 inches long. The antenna portion 14 and matching network 16, 18 are all electrically connected to each other and should be made of copper or other highly conductive material; the core should preferably be a dimensionally stable plastic such as Delrin. The support can be either concave (film on inside of cylinder 12) or convex (film on outside of cylinder 12).

During testing, the mobile phone 22 under test is placed on a support 24 positioned within an air chamber 30 which provides radio frequency shielding and which surrounds the mobile phone 22 under test. The shielded chamber 30 is lined with radio frequency signal absorptive material. A radio equipment automated testing circuit, e.g. a CMD80 tester not shown in the figures, is external to the chamber 30 and connected through a lead 26 to the antenna 10 and through another lead 34 to the phone 22 through the support 24. The lead 26 is connected to the antenna 10 at the point 17 of the finger portion 18 by a coaxial connector 21, although the electrical connection of the lead could simply be by soldering.

The antenna 28 of the mobile phone 22 under test is positioned coaxially within the cylindrical antenna 10 mounted within the air chamber 30. The lid 32 of the chamber 30 is then installed and the test is run using the CMD80 (not shown) in an otherwise conventional manner.

The dimensions of the antenna 10 are such that the induced signal levels are approximately −20 dB, so as to induce a minimum perturbation of the phone's antenna. The matching network is designed for best match on US-AMPS and PCS bands (824–894 MHZ and 1850–1990 MHz respectively). Other bands are possible. Calibration and testing are performed using existing protocols and software. Test data exhibit a very high degree of reproducibility.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. An antenna for testing mobile phones of the type having a protruding antenna, comprising:
   a hollow cylinder of electrically insulating material for surrounding a portion of the protruding antenna during testing;
   a first, electrically conductive film portion mounted around a peripheral surface of the hollow cylinder, wherein the first, electrically conductive film includes a first band portion extending in a circumferential direction around a peripheral surface of the hollow cylinder; and
   an integral matching network which includes a second, electrically conductive film portion mounted around a peripheral surface of the hollow cylinder and electrically connected to the first, electrically conductive film portion, wherein the second, electrically conductive film portion includes a finger portion extending from the first band portion in a direction parallel to an axis of rotation of the hollow cylinder, the finger portion tapering to a point at a location furthest from the first band portion, and a second band portion having a width that is smaller than the width of the first band portion, the second band portion extending from the point of the finger portion in a circumferential direction only partially around the peripheral surface of the hollow cylinder.

2. An antenna for testing mobile phones of the type having a protruding antenna, comprising:
   a hollow cylinder of electrically insulating material for surrounding a portion of the protruding antenna during testing; and
   an electrically conductive film mounted on a surface of the hollow cylinder, the film including a first band portion extending in a circumferential direction entirely around a peripheral surface of the hollow cylinder, a finger portion extending from the first band portion in a direction parallel to an axis of rotation of the hollow cylinder, the finger portion tapering to a point at a location furthest from the first band portion, and a second band portion having a width that is smaller than the width of the first band portion, and extending from the point of the finger portion in a circumferential direction only partially around the peripheral surface of the hollow cylinder.

3. An antenna according to claim 2, further including an electrical connection to the point of the finger portion for connecting the antenna to a testing apparatus.

4. An antenna according to claim 2, wherein the film is copper.

5. An antenna according to claim 2, wherein the second band portion extends from the point of the finger portion in a circumferential direction half way around the peripheral surface of the hollow cylinder.

6. An antenna according to claim 2, wherein the film is on the order of 1.5 mils thick.

7. An antenna according to claim 2, wherein the hollow cylinder is ¾" in diameter.

8. An antenna according to claim 7, wherein the hollow cylinder is made of polyvinyl chloride (PVC) pipe.

9. An apparatus for testing mobile phones of the type having a protruding antenna, comprising:
   an air chamber which provides radio frequency shielding and which surrounds the mobile phone under test;
   a radio equipment automated testing circuit;
   an antenna mounted within the air chamber which includes:
      a hollow cylinder of electrically insulating material for surrounding a portion of the protruding antenna during testing;
      an electrically conductive film mounted on a surface of the hollow cylinder, the film including a first band portion extending in a circumferential direction entirely around a peripheral surface of the hollow cylinder, a finger portion extending from the first band portion in a direction parallel to an axis of rotation of the hollow cylinder, the finger portion tapering to a point at a location furthest from the band portion, and a second band portion having a width that is smaller than the width of the first band portion, and extending from the point of the finger portion in a circumferential direction only partially around the peripheral surface of the hollow cylinder;
      an electrical connection to the point of the finger portion for connecting the antenna to the radio equipment automated testing circuit.

10. An apparatus for testing mobile phones according to claim 9, wherein the radio equipment automated testing circuit is a CMD80 tester.

11. A method of testing mobile phones of the type having a protruding antenna, comprising the steps of:
   placing the mobile phone under test in an air chamber which provides radio frequency shielding which surrounds the mobile phone under test;
   inserting the protruding antenna of the mobile phone coaxially within a cylindrical antenna mounted within the air chamber and which includes:
      a hollow cylinder of electrically insulating material for surrounding a portion of the protruding antenna during testing;
      an electrically conductive film mounted on a surface of the hollow cylinder, the film including a first band portion extending in a circumferential direction entirely around a peripheral surface of the hollow cylinder, a finger portion extending from the first band portion in a direction parallel to an axis of rotation of the hollow cylinder, the finger portion tapering to a point at a location furthest from the band portion, and a second band portion having a width that is smaller than the width of the first band portion, and extending from the point of the finger portion in a circumferential direction only partially around the peripheral surface of the hollow cylinder;

an electrical connection to the point of the finger portion for connecting the antenna to a radio equipment automated testing circuit; and operating the mobile phone within the air chamber while the cylindrical antenna is connected to the radio equipment automated testing circuit.

12. A method of testing mobile phones according to claim 11, wherein the radio equipment automated testing circuit is a CMD80 tester.

* * * * *